United States Patent

Aschner et al.

[11] Patent Number: 5,850,737
[45] Date of Patent: Dec. 22, 1998

[54] PROCESS FOR CONTROLLING THE CHARGING PRESSURE IN AN EXHAUST GAS TURBOCHARGER WITH AN ADJUSTABLE TURBINE GEOMETRY

[75] Inventors: Werner Aschner, Ulm; Horst Hanauer, Althütte; Gernot Hertweck, Fellbach, all of Germany

[73] Assignee: Mercedes Benz AG, Germany

[21] Appl. No.: 706,318

[22] Filed: Aug. 30, 1996

[30] Foreign Application Priority Data

Aug. 30, 1995 [DE] Germany .......... 195 31 871.4

[51] Int. Cl.$^6$ .................................. F02B 37/22
[52] U.S. Cl. ................................. 60/602
[58] Field of Search ................... 60/600–603

[56] References Cited

U.S. PATENT DOCUMENTS 5,174,119 12/1992 Hanauer et al. ............ 60/602
5,440,879 8/1995 Dellora .

FOREIGN PATENT DOCUMENTS 0 323 256 of 1988 European Pat. Off. .
36 24 248 1/1988 Germany .
40 25 901 of 1992 Germany .
62182437 of 1987 Japan .
3-105022 5/1991 Japan ...................... 60/602
2 172 340 3/1985 United Kingdom .

Primary Examiner—Michael Koczo
Attorney, Agent, or Firm—Evenson, McKeown, Edwards & Lenahan, P.L.L.C.

[57] ABSTRACT

The invention provides a process for adjustment of the charging pressure in an internal-combustion engine exhaust gas turbocharger having an adjustable turbine geometry, to a predetermined operating-point-dependent desired charging pressure value. A fuzzy control function in an electronic control unit has as input quantities, a control difference and a control quantity, the latter being determined as the difference between an engine-operating-point-dependent maximum permissible differential pressure and a current differential pressure. The differential pressure is calculated as the difference from the exhaust back pressure and the charging pressure, so that unacceptable super elevation of the exhaust back pressure is recognized in the case of a positive load change, and is corrected by opening the blade position of the exhaust gas turbocharger with the variable turbine geometry, so that an optimum buildup of the torque takes place.

7 Claims, 3 Drawing Sheets

PROCESS FOR CONTROLLING THE CHARGING PRESSURE IN AN EXHAUST GAS TURBOCHARGER WITH AN ADJUSTABLE TURBINE GEOMETRY

BACKGROUND AND SUMMARY OF THE INVENTION

This invention relates to a process for controlling the charging pressure in an internal-combustion engine exhaust gas turbocharger having an adjustable turbine geometry, to a predetermined operating-point-dependent desired value.

German Patent Document DE 40 25 901 C1, discloses a process for preventing the occurrence of uncontrolled super elevations of pressure after a positive load change when the charging pressure p2 in the exhaust pipe upstream of the turbine is still rising. Thereby the internal-combustion engine needs no longer exhaust against a super elevated exhaust back pressure, facilitating increased efficiency of the internal-combustion engine. For this purpose, a limit pressure switch is provided in the exhaust pipe to control the exhaust back pressure p3. The limit pressure switch changes its switching condition upon the occurrence of a certain limit pressure; that is, in the case of an exhaust back pressure which exceeds a limit pressure or a threshold value, the limit pressure switch is changed from a closed position into an open position.

The disadvantage of this process is that, in the case of such a monitoring of the exhaust back pressure p3, only the momentary exhaust back pressure existing upstream of the turbine is detected and compared with a limit or threshold value. This measurement does not reflect the current atmospheric pressure (that is, the elevation above the sea level); also, the current charging pressure p2 cannot be taken into account during monitoring. In addition, the limit pressure switch permits only a larger or smaller differentiation but not continuous evaluation.

Japanese Patent Document JP 62-182437 discloses a process for controlling the charging pressure in an internal-combustion engine exhaust gas turbocharger with an adjustable turbine geometry of the generic type referred to above. In this process the above-mentioned disadvantages are mitigated by measuring the pressure difference between the exhaust gas pressure and the current charging pressure, rather than the absolute value of the exhaust gas pressure, for controlling exhaust gas turbocharger. It is a disadvantage of this process, however, that, according to the block diagram described therein, a high-expenditure sequence of successive computing steps is required which are detected and evaluated by a high-expenditure control device.

It is therefore an object of the present invention to provide a process which uses simple apparatus to control the internal-combustion engine, with improved operating efficiency, during the transient operation of the internal-combustion engine, particularly after a positive load change from low load and rotational speed ranges.

This object is achieved according to the invention by means of a process which, in transient operation of the internal-combustion engine, in the case of a positive load change during the rise of the charging pressure, prevents in a simple manner unacceptable exhaust back pressure super elevations which (because of the correspondingly occurring negative load change) tend to counteract the engine torque, reducing it in an unacceptable manner. According to the invention, such unacceptable super elevations of pressure are detected directly by a comparison of the exhaust back pressure with an engine operation-dependent limit pressure, taking into account the current charging pressure. When the control unit recognizes an unacceptable super elevation of the exhaust back pressure, the charge pressure is controlled by adjusting the blade position of the variable turbine geometry exhaust gas turbocharger toward the opening direction, so that the exhaust gas pressure in front of the turbine is reduced to the maximum permissible limit pressure. Such adjustment is performed by means of a control element connected with a turbine guide apparatus, based on the regulator current emitted by a fuzzy control unit.

Other objects, advantages and novel features of the present invention will become apparent from the following detailed description of the invention when considered in conjunction with the accompanying drawings.

DETAILED DESCRIPTION OF THE DRAWINGS

Figure 1:
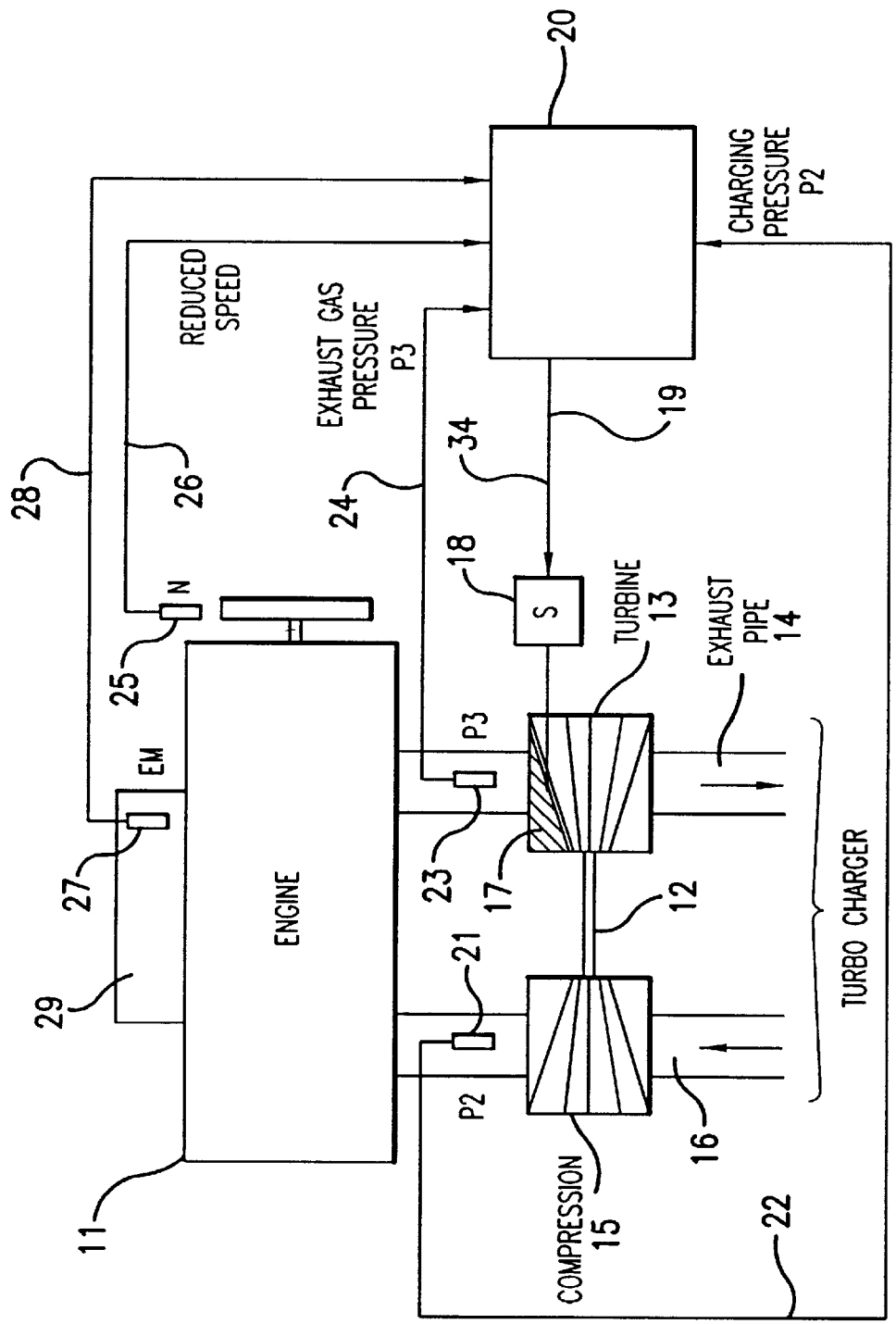
FIG. 1 is a schematic diagram of an advantageous arrangement for implementing the process according to the invention.

FIG. 1 illustrates an internal-combustion engine 11 with an exhaust gas turbocharger 12 whose turbine 13 is arranged in the exhaust pipe 14 and whose compressor 15 is arranged in the intake pipe 16. To improve the response of the exhaust gas turbocharger 12 in the case of a positive load change (particularly from low load and rotational speed ranges), its turbine 13 has a turbine guide apparatus 17, which for reasons of clarity, is outlined only schematically in the drawing. By means of this turbine guide, on the one hand, both the approach flow cross section and the approach flow direction of the exhaust gases onto the turbine blades can be changed. The turbine guide apparatus 17 is actuated by a servo motor 18 which, in turn, can be controlled by way of the control line 19 by an electronic control unit 20.

A signal which corresponds to the current charging pressure p2 is fed to the control unit 20 by a sensor 21, via a measuring line 22. A sensor 23 and a measured-value line 24 supply a signal which corresponds to the current exhaust gas pressure p3 in front of the turbine 13, while a sensor 25 and a measured-value line 26 provide a signal which corresponds to the current rotational speed n of the internal-combustion engine, both of which signals are fed to the electric control unit 20. By way of the sensor 27 in the injection system 29 and the measured-value line 28, the control unit 20 also receives a signal which corresponds to the current injection quantity of the internal-combustion engine 11. The current injection quantity is determined from the position of the accelerator pedal (not shown), which in turn is determined by the driver in the case of a positive load change, as, for example, from idling to a full load.

In the case of a positive load change of the internal-combustion engine 11, the turbine guide apparatus 17 is first changed into a closed position; that is, into a position which reduces to a minimum the approach flow cross-section for the exhaust gases onto the turbine 13. Because the approach flow cross-section of the turbine 13 is constructed to be very small, the exhaust gas pressure p3 rises very rapidly so that, even before the charging pressure p2 has reached the desired value p2 corresponding to this operating point, the exhaust back pressure p3 is considerably super elevated which is a detriment to the efficiency of the internal-combustion engine 11. As a result, it is necessary that the super elevation of the exhaust back pressure p3 is monitored and controlled so that an optimal torque buildup can be achieved which results in a high efficiency of the internal-combustion engine 11.

Figure 2:
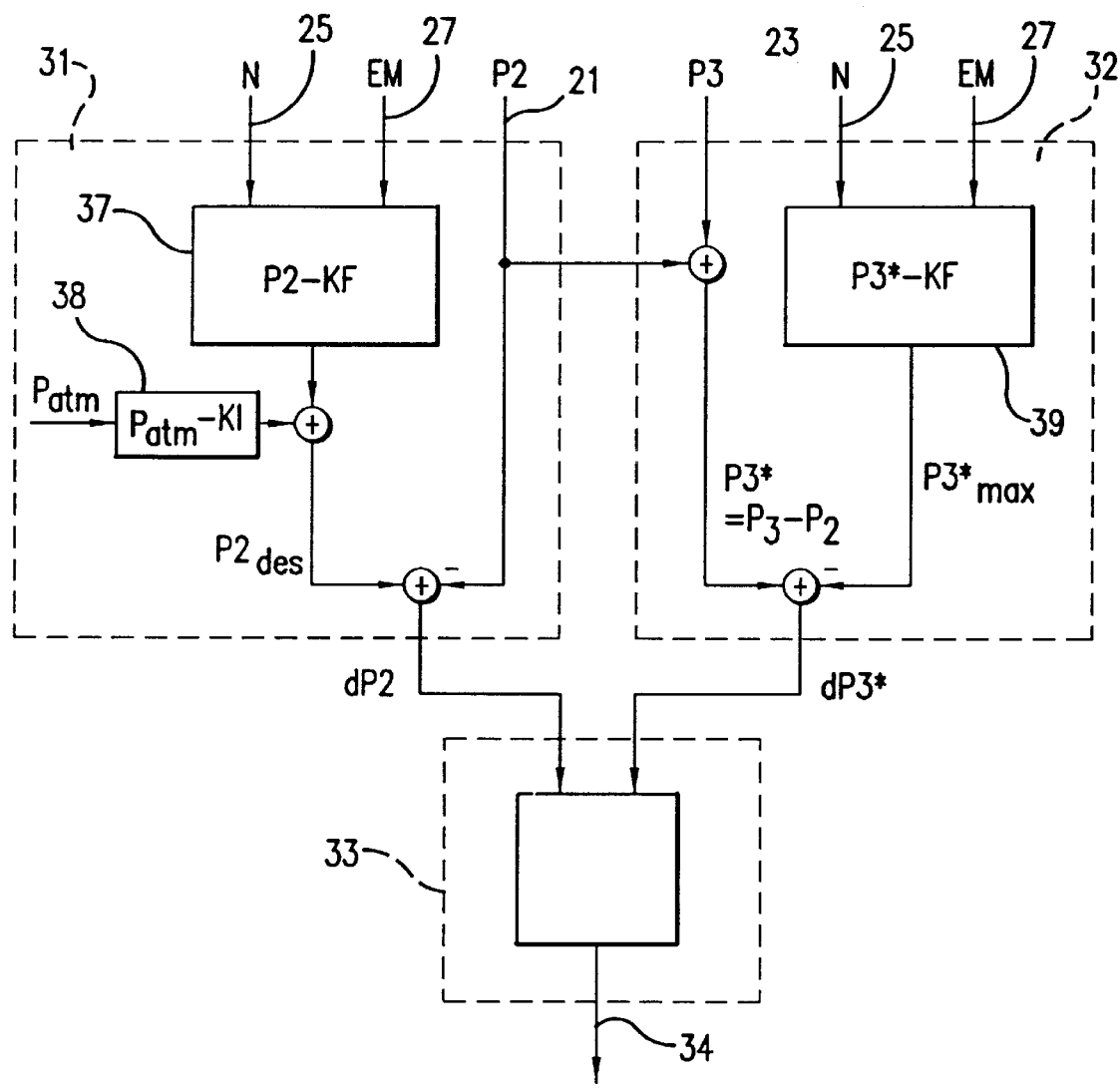
FIG. 2 is a functional block diagram of a method of operation of the electronic control unit according to the invention which has the reference number 20 in FIG. 1.

FIG. 2 is a functional block diagram of an electronic control unit 20 which has a control structure for controlling the exhaust gas turbocharger 12 with a variable turbine geometry, by means of a control difference block 31, a monitoring block 32 and a controller 33. The control difference block 31 and the monitoring block 32 furnish the required control deviations or monitoring values for the controller 33 which, as illustrated in FIG. 1, controls the servo motor 18 by way of a regulator current 34. As a function of the regulator current, the control element 18 causes the opening or closing of the turbine guide apparatus with respect to the approach flow cross-section.

In the control difference block 31, the current charging pressure p2 of the internal-combustion engine 11 is received from the sensor 21 via the measured-value line 22. At the same time, a fundamental charging pressure value is determined in the control difference block 31 from an applicable characteristic charging pressure diagram, based on the detected measured data by way of the sensors 25 and 27 as a function of the rotational engine speed and the injection quantity, as illustrated by block 37. In addition, an elevation-dependent correction value is formed in block 38, based on atmospheric pressure and an applicable characteristic correction curve. The sum of the fundamental charging pressure value and of the elevation-dependent correction value results in a desired charging pressure value $p2_{des}$ at which the internal-combustion engine 11 achieves an optimal efficiency. The differential pressure between the desired charging pressure value $p2_{des}$ and the current charging pressure p2 behind the turbine 15 in the intake pipe 16 is determined by subtraction. This differential pressure is emitted as the control difference dp2 by the control difference block 31, and is transmitted to the controller 33.

In the monitoring block 32 of the electronic control unit 20, a maximum permissible differential pressure $P3^*_{max}$ is determined in an applicable characteristic differential pressure diagram 39, as a function of rotational engine speed and injection quantity (from the data of the sensors 25, 27). In parallel thereto, the current value of the exhaust back pressure p3 detected by the sensor 23 is compared to the actual value of the charging pressure p2, resulting in an effective differential pressure p3*. The advantage of this determination of differential pressure is that the monitoring is largely independent of the current atmospheric pressure; in addition, the currently existing charging pressure p2 is taken into account during the monitoring which takes place in this monitoring block.

Analogously to the determination of the control deviation dp2 in control difference block 31, a control quantity dp3* is now determined by subtraction of the current differential pressure p3* from the maximum permissible differential pressure $p3^*_{max}$. This control quantity dp3* is provided as another input to the controller 33.

The control quantity dp3* can assume values which are negative, approximately equal to zero or zero as well as positive. A control quantity dp3* which is much lower than zero, for example, means that the exhaust back pressure p3 is too high for optimal torque buildup. Thus, the controller 33 must be designed such that in this case the charge pressure p2 is controlled by adjusting the blade position of the exhaust gas turbocharger 12 with the variable turbine geometry in the opening direction. In this manner, the exhaust gas pressure p3 in front of the turbine 13 is therefore reduced to the maximum permissible limit pressure.

Analogously, when the control quantity dp3* is much larger than zero (indicating that the exhaust back pressure p3 is too low for an optimal torque buildup), the exhaust back pressure is built up by accelerating the closing of the blade position of the exhaust gas turbocharger 12 with the variable turbine geometry. When a control quantity dp3* is almost zero, the exhaust back pressure p3 on the turbine 13 permits an optimal torque buildup, so that no adjustment of the turbine guide apparatus 17 is required.

Figure 3:
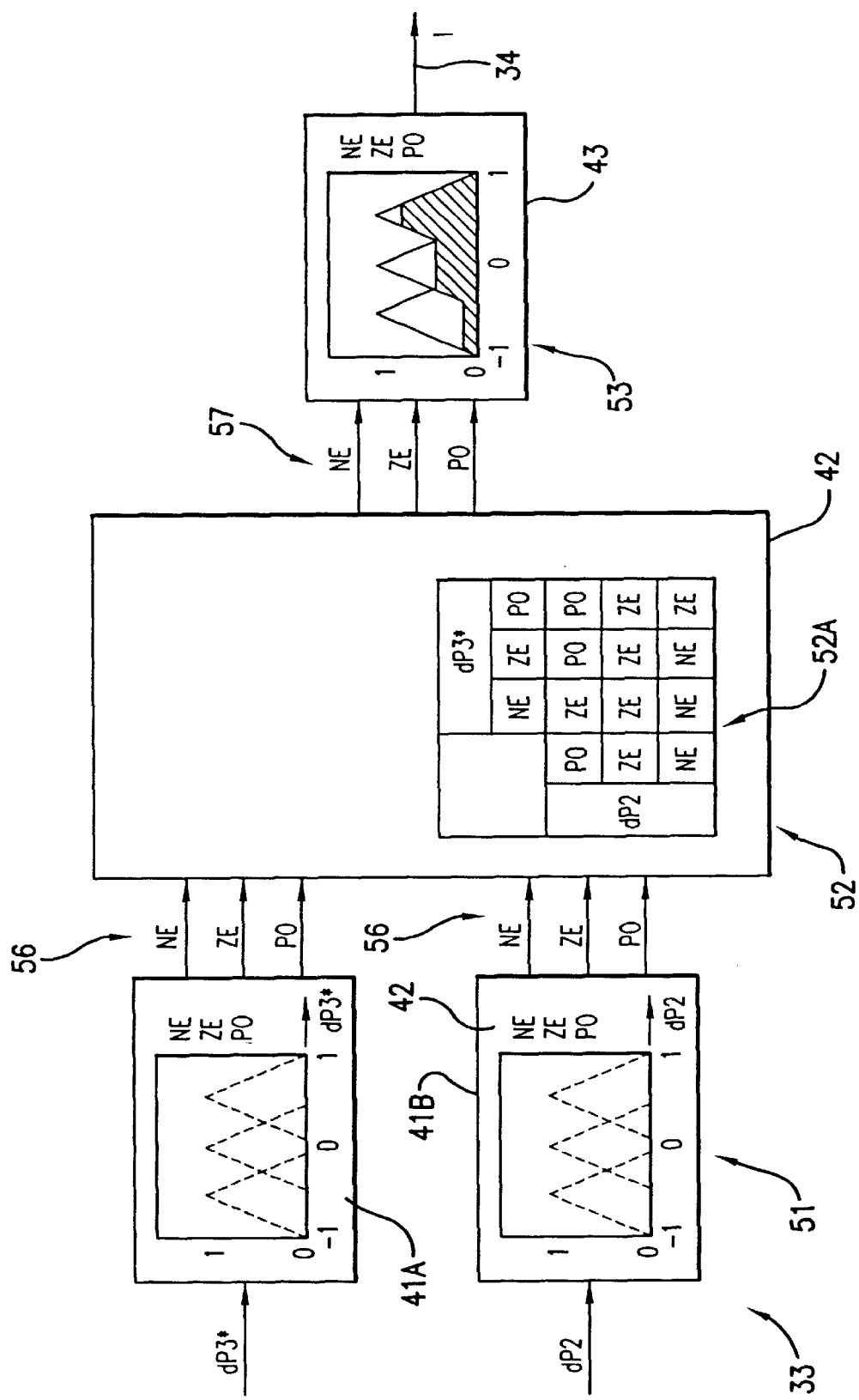
FIG. 3 is functional block diagram of the method of operation of the fuzzy control unit according to the invention illustrated in FIG. 2.

To implement a suitable control algorithm which correspondingly interprets the control quantity dp3* for the above-mentioned operating conditions and simply evaluates and converts it in a simple manner, a fuzzy logic control unit is used as the controller 33, as illustrated in FIG. 3.

Such a fuzzy logic controller 33 has the advantage that, in addition to the control deviation dp2, other control quantities can be used to calculate the regulator current 34. In particular, by the processing of another control quantity in comparison to known PID-controllers, an additional control element limitation can be provided from the start in order to permit only certain operating conditions, as described below.

To process the inputs from the control difference block 31 and the monitoring loop 32, the fuzzy logic controller 33 implements a first step 51—a fuzzification. That is, for example, the input quantities dp3* and dp2 are divided into the linguistic terms "negative" (NE), "Positive" (PO) and "zero" (ZE) (designated generally by reference number 56, as illustrated in blocks 41A and 41B. In a second step 52, by means of an inference matrix 52A, the relationship between the input quantities dp2 and dp3* and the output quantity I is defined in an application-specific manner. As an example, the output quantity I is also divided into the linguistic terms "negative" (NE), "positive" (PO) and "zero" (ZE). This division can be differentiated further, for example, into "very much smaller" and "very much larger" or the like, if it is required by the control system.

The inference matrix 52A in block 42 assigns a linguistic term for the output quantity I to possible combinations of the linguistic terms of the input quantity dp3* (1st line) and dp2 (1st column). The linguistic term 57 for the output quantity I is converted into a regulator current 34 in a third step 53—a defuzzification—according to block 43.

As an example, the function and method of operation of the fuzzy controller 33 is described for the case in which the dp3* input is "negative" (NE). This means that the exhaust back pressure p3 is too high for an optimal torque buildup. According to the inference matrix 52A in block 42, only the linguistic terms NE and ZE are possible as the output quantity for the regulator current 34, so that positive reinforcement range of the fuzzy logic controller 33 is reduced. As a result, specifically, in the case of very large p3-values, the opening of the turbine blades (which are open in the case of an output variable NE) is accelerated.

In the case of an output variable ZE, these, for example, have a center position or are partially closed. As a result, because of the assignment of the output variables ZE and NE in column NE, the control quantity dp3* can be ensured so that only a reduction of the exhaust back pressure p3 is possible by opening the turbine blades. An analogous situation exists for the additional control quantities dp3* which are shown as examples in the matrix.

In this embodiment, the fuzzy logic controller 33 has a P-behavior with respect to the dp2-input. The control member 18 of the turbine guide apparatus 17 is constructed as a servo motor with an I-characteristic so that, in the case of a constant regulator current 34, because of the I-characteristic, a constant control speed can be achieved.

As an alternative, it can also be provided that a control element 18 with a P-behavior is used for the turbine guide apparatus 17, in which case a fuzzy logic controller 33 with an I- or PI-behavior must then be used in order to avoid remaining control differences.

In the third step 53, the conversion of the linguistic output terms 57 (NE, PO, ZE) takes place into an analogous current value 34 according to the known defuzzification methods, which is input to the servo motor 18 to drive the turbine guide apparatus 17, as shown in FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In an internal-combustion engine charged by an exhaust gas turbocharger with an adjustable turbine geometry, a process for controlling charging pressure to an operating-point-dependent desired charging pressure value, comprising the steps of:

detecting a first control quantity in the form of a control deviation between a desired charging pressure value and an actual charging pressure value;

detecting at least one additional control quantity;

generating a regulator current determined as a function of said control deviation and said additional control quantity, an electronic control unit; and controlling said turbine geometry as a function of said regulator current, including controlling said turbine geometry into a configuration which reduces the approach flow cross-section onto the turbine, after a positive load chance of the internal-combustion engine.

2. Process according to claim 1, wherein said at least one additional control quantity is determined in a monitoring block as a function of exhaust gas pressure.

3. Process according to claim 1, wherein a control algorithm for determining said charging pressure is a function of the additional control quantity.

4. Process according to claim 1, wherein the said at least one additional control quantity is determined as the difference between an operating-point-dependent maximum permissible differential pressure and current differential pressure, the current differential pressure being calculated as the difference between exhaust back pressure and charging pressure.

5. Process according to claim 3, wherein the intervention of the additional control quantity into the control algorithm is implemented by means of a fuzzy control unit6.

6. Process according to claim 5, wherein the fuzzy control unit has an inference matrix in which the control deviation has a P-behavior and a control element is provided which has an I-characteristic.

7. Process according to claim 1 wherein said electronic control unit comprises a fuzzy logic control unit integrated therein.

* * * * *